United States Patent
Gaither et al.

(10) Patent No.: US 7,373,457 B2
(45) Date of Patent: *May 13, 2008

(54) CACHE COHERENCE PROTOCOL FOR A MULTIPLE BUS MULTIPROCESSOR SYSTEM

(75) Inventors: Blain D. Gaither, Ft Collins, CO (US); Russ W Herrell, Ft Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 342 days.

This patent is subject to a terminal disclaimer.

(21) Appl. No.: 11/049,306

(22) Filed: Feb. 1, 2005

(65) Prior Publication Data

US 2005/0177688 A1    Aug. 11, 2005

Related U.S. Application Data

(63) Continuation of application No. 09/704,176, filed on Oct. 13, 2000, now Pat. No. 6,868,481.

(51) Int. Cl.
*G06F 12/00* (2006.01)

(52) U.S. Cl. .................. 711/119; 711/141; 711/144; 711/145

(58) Field of Classification Search ............... 711/119, 711/141, 144, 145
See application file for complete search history.

(56) References Cited

U.S. PATENT DOCUMENTS

| | | | | |
|---|---|---|---|---|
| 5,175,837 A | * | 12/1992 | Arnold et al. | 711/152 |
| 5,222,224 A | * | 6/1993 | Flynn et al. | 711/144 |
| 5,325,504 A | * | 6/1994 | Tipley et al. | 711/128 |
| 5,655,103 A | * | 8/1997 | Cheng et al. | 711/152 |
| 5,749,087 A | * | 5/1998 | Hoover et al. | 711/108 |
| 5,875,468 A | * | 2/1999 | Erlichson et al. | 711/143 |
| 5,897,656 A | * | 4/1999 | Vogt et al. | 711/141 |
| 5,991,819 A | * | 11/1999 | Young | 709/253 |
| 5,995,967 A | * | 11/1999 | Iacobovici et al. | 707/100 |
| 6,049,847 A | * | 4/2000 | Vogt et al. | 710/309 |
| 6,105,113 A | * | 8/2000 | Schimmel | 711/146 |
| 6,289,419 B1 | * | 9/2001 | Takahashi | 711/141 |
| 6,304,945 B1 | * | 10/2001 | Koenen | 711/141 |
| 6,409,625 B1 | * | 6/2002 | Sakai et al. | 475/208 |
| 6,438,659 B1 | * | 8/2002 | Bauman et al. | 711/141 |
| 6,574,710 B1 | * | 6/2003 | Gaither et al. | 711/122 |
| 6,633,958 B1 | * | 10/2003 | Passint et al. | 711/141 |
| 2003/0009638 A1 | * | 1/2003 | Sharma et al. | 711/145 |

OTHER PUBLICATIONS

Liu, "Partial Address Directory for Cache Access," pp. 226-240, IEEE, 1994.

(Continued)

*Primary Examiner*—Stephen C. Elmore

(57) ABSTRACT

A computer system maintains a list of tags (called a Global Ownership Tag List (GOTL)) for all the cache lines in the system that are owned by a cache. The GOTL is used for cache coherence. There may be one central GOTL. Alternatively, the GOTL may be distributed, so that every device that can request a copy of memory data maintains a local copy of the GOTL. The GOTL can be limited to a relatively small size. For a limited size list, a tag may need to be evicted to make room for a new tag. A line associated with an evicted tag must be written back to memory.

4 Claims, 5 Drawing Sheets

OTHER PUBLICATIONS

Wu et al., "A New Cache Directory Scheme, " pp. 466-472, IEEE, 1996.

Jim Handy, "The Cache Memory Book, Second Edition, " Glossary, "Tag" definition, pp.-220, 1998.

Crawford et al., "Cache Coherence in A Multiport Memory Environment", Dept. of Elec. & Comp. Eng.:Univ. of Central Florida; IEEE Comp. Soc. Press 2-6, May 1994; pp. 632-642.

Michael Carlton et al., Univ. of S. Calif.; "Mutiple-Bus Shared-Memory System: Aquarius Project"; Computer Journal; vol. 23, No. 6; Jun. 1990; pp. 80-83.

Jones et al., Dept. of Elect. and Comp. Eng.; TN Tech. Univ; " Hdwr-based Methods for Maintaining Cache Coherency in a Multiprocessor System"; Mar. 8-10, 1998; IEEE; pp. 549-553.

* cited by examiner

| GOTL |
|---|
| CONTAINS AN ADDRESS REFERENCE (WHICH MAY BE A TAG) FOR EVERY LINE IN THE CACHES FOR WHICH A CORRESPONDING LINE IN MEMORY MAY NOT BE IDENTICAL; AND AN INDICATOR OF WHICH CACHE OWNS EACH LINE; AND DOES NOT CONTAIN ADDRESS REFERENCES (OR DATA CORRESPONDING TO THE ADDRESS REFERENCES) FOR LINES THAT ARE SHARED OR UNCACHED. |

FIG. 5

CACHE COHERENCE PROTOCOL FOR A MULTIPLE BUS MULTIPROCESSOR SYSTEM

This application is a continuation of U.S. application Ser. No. 09/704,176, filed Oct. 31, 2000, now U.S. Pat. No. 6,868,481, which is incorporated herein.

FIELD OF INVENTION

This invention relates generally to computer systems and more specifically to cache memory systems and still more specifically to coherency protocols for cache memory systems in multiprocessor computer systems.

BACKGROUND OF THE INVENTION

Most computer systems employ a multilevel hierarchy of memory systems, with relatively fast, expensive, limited-capacity memory at the highest level of the hierarchy and proceeding to relatively slower, lower cost, higher-capacity memory at the lowest level of the hierarchy. Typically, the hierarchy includes a small fast memory called a cache, either physically integrated within a processor integrated circuit or mounted physically close to the processor for speed. There may be separate instruction caches and data caches. There may be multiple levels of caches.

The minimum amount of memory that can be transferred between a cache and a next lower level of the memory hierarchy is called a line, or block, or page. The present patent document uses the term "line," but the invention is equally applicable to systems employing blocks or pages. It is common to use some of the bits of the line address to index the cache, and the remaining set of bits of each physical address are stored, along with the data, as the tag.

Many computer systems employ multiple processors, each of which may have multiple levels of caches. Some caches may be shared by multiple processors. All processors and caches may share a common main memory. A particular line may simultaneously exist in memory and in the cache hierarchies for multiple processors. All copies of a line in the caches must be identical, a property called coherency. The protocols for maintaining coherence for multiple processors are called cache coherence protocols. If a processor changes the contents of a line, only the one changed copy is then valid, and all other copies in caches and memory must be then be updated or invalidated. If the copy of a line in memory is not identical to a copy in a cache, then the line in memory is referred to as a "stale" line, and the line in the cache is referred to as being "dirty". The "most current copy" of a modified line is the most recently modified copy. If the line is cached but not modified, the most current copy is any copy, including the copy in memory. If the line is not cached, the most current copy of a line is in memory.

Cache coherence protocols commonly place each cached line into one of multiple states. One common approach uses three possible states for each line in a cache. Before any lines are placed into the cache, all entries are at a default state called "invalid". When an uncached physical line is placed into the cache, the state of the entry in the cache is changed from invalid to "shared". If a line is modified in a cache, it may also be immediately modified in memory (called write through). Alternatively, a cache may write a modified line to memory only when the modified line in the cache is invalidated or replaced (called write back). For a write-back cache, when a line in the cache is modified, the state of the entry in the cache is changed to "modified". The three-state assignment just described is sometimes called a MSI protocol, referring to the first letter of each of the three states.

A common variation adds one additional state. In the variation, when a physical line is copied into the cache, if no copy of the line exists in any other cache, the line is placed in an "exclusive" state. The word "exclusive" means that exactly one cache hierarchy has a copy of the line. If a line is in an "exclusive" state in a cache hierarchy for a first processor, and if a second processor requests the same line, the line will then be copied into two cache hierarchies, and the state of the entry in each cache is set to "shared". This four-state assignment just described is sometimes called a MESI protocol, referring to the first letter of each of the four states. There are many other variations.

A cache "owns" a line if the cache has permission to modify the line without issuing any further coherency transactions. If a cache owns a line, the line is potentially dirty (modifiable), and may be actually dirty (modified). There can only be one "owner" of a line. If the current owner of a line has modified the line, the most current copy of a line is always obtained from the current owner. If a line has not been modified, the most current copy of the line is any copy, including the copy in memory. For any cache coherence protocol, the most current copy of a cache line must be retrieved from the current owner, if any, and a copy of the data must be delivered to the requester. If the line is to be modified, ownership must be acquired by the requestor, and any shared copies must be invalidated.

There are three common approaches to determine the location of the owner of a line, with many variations and hybrids. In one approach, called a snooping protocol, or snoop-based protocol, the owner is unknown, and all caches must be interrogated (snooped) to determine the location of the most current copy of the requested line. All requests for access to a cache line, by any device in the system, are forwarded to all caches in the system. Eventually, the most current copy of a line is located and a copy is provided to the requester.

In a second approach, called a directory-based protocol, memory is provided to maintain information about the state of every line in the memory system. For example, for every line in memory, a directory may include a bit for each cache hierarchy to indicate whether that cache hierarchy has a copy of the line, and a bit to indicate whether that cache hierarchy has ownership. For every request for access to a cache line, the directory must be consulted to determine the owner, and then the most current copy of the line is retrieved and delivered to the requestor. Typically, tags and status bits for a directory are stored in main memory, so that a request for state information cycles main memory and has the latency of main memory.

A third approach is a global coherency filter, which has a tag for every line in the cache system. A coherency filter is a snoop system with a second set of tags, stored centrally, for all caches in the system. A request for a cache line is forwarded to the central filter, rather than to all the caches. The tags for a coherency filter are typically stored in a small high-speed memory.

For relatively small systems, with one bus or with only a few buses, snoop-based protocols provide the best performance. However, snoop-based systems increase bus traffic, and for large systems, snoop traffic can limit overall performance. Directory-based systems increase the time required to retrieve a line (latency), but require less bus traffic than snoop-based systems. For large multiple bus systems, where bus traffic may be more important than latency, directory-based systems typically provide the best overall performance. Many computer systems use some sort of hybrid of snoop-based and directory-based protocols. For example, for a multiple bus system, snoop-based protocols may be used for coherency on each local bus, and directory-based protocols may be used for coherency across buses.

There is an ongoing need for improved cache coherence protocols, particularly for large multiple bus multiprocessor systems.

SUMMARY OF THE INVENTION

A computer system in accordance with the invention maintains a list of tags (called a Global Ownership Tag List (GOTL)) for all the cache lines in the system for which a cache has ownership. That is, for each tag in the GOTL, the corresponding line may be dirty, or may be only potentially dirty (modifiable). If a line is requested by a device, the line's tag is compared against the GOTL. There are four cases, depending on whether the requested line will be shareable by the requester, or owned by the requester, and whether the requested line is in the GOTL: (1) shareable, GOTL miss; (2) shareable, GOTL hit; (3) owned, GOTL miss; (4) owned, GOTL hit. For case (1), the line is not in the GOTL, no cache has ownership, so the line is retrieved from memory. There is no need to update the GOTL for a shareable line. For case (2), a requesting device requests a line, but not ownership, the line is in the GOTL, some cache has ownership, and the most current data is returned to the requester. Since the owner may modify the line without issuing a coherency transaction, if the line remains owned it would be possible to violate coherency, so ownership must be revoked (the entry in the GOTL is removed). For case (3), a requesting device requests ownership, the line is retrieved from memory, and space for a new entry in the GOTL is allocated to indicate that the line is now owned by the requestor. For case (4), a requesting device requests ownership, the line is in the GOTL, some cache has ownership, and the most current copy of the data and ownership are both transferred to the requestor. For case (4), ownership is changed, so the GOTL is updated to designate the new ownership.

There may be one central GOTL. Alternatively, the GOTL may be distributed, so that every device that can request a copy of memory data (for example, processors, bus bridges, and snoop filters) maintains a local identical copy of the GOTL. The number of tags in a GOTL can be much smaller than the number of lines in all the caches in the system. For a limited size GOTL, an existing tag may need to be evicted to make room for a new tag. A line associated with an evicted tag must be written back to memory if the line was actually modified. Typically, a GOTL can be much smaller than a directory or a global coherency filter, and can provide better performance than a directory-based system or a global coherency filter system. In addition, a GOTL can remain fixed in size even if the size of main memory changes, or if the size of the caches changes, because a GOTL is inclusive only of the modified or modifiable lines in the system, rather than all the cache lines in the system.

BRIEF DESCRIPTION OF THE DRAWINGS

FIG. 5 is a block diagram illustrating an example of additional detail for a GOTL.

DETAILED DESCRIPTION OF THE PREFERRED EMBODIMENT OF THE INVENTION

For any cache coherence protocol, if a requested line is not owned (dirty or potentially dirty), then any copy, and in particular, the copy in main memory, is sufficient. If the line could possibly be made dirty, then ownership must be transferred from the current owner, if any, to the requesting device. If the line is already dirty, then the most current copy must be returned to the requester, and ownership must be transferred from the current owner to the requesting device. Accordingly, whether or not a line is owned by a cache is an essential piece of information needed for coherence in a multiple cache system. Consider a system in which cached lines have only two metastates for purposes of coherence: owned or shareable. All shareable cache lines are not owned by any device. All owned cache lines are potentially modifiable. If a device has access to a list of owned lines and their owners, then the device effectively knows all that is absolutely required to be known about the state of each line for purposes of coherence.

In accordance with the invention, a computer system may maintain a list of tags and their owners (called a Global Ownership Tag List (GOTL)), for all the owned cache lines in the system. In some systems, the metastate "owned" corresponds to a single state. For example, for a MSI system, the GOTL may maintain a list of all lines in the system having a state of "modified". For a MESI system, when a line in the "exclusive" state is modified, the state is locally changed to "modified". However, it is not necessary to broadcast the change of state to other parts of the system, because there is only one copy. For a MESI or similar system, the GOTL needs to add a line to the list when the line is assigned the "exclusive" state, because the line may later be modified without notification to the rest of the system. Accordingly, for a MESI system, the computer system may maintain a list of all lines in the system having a state of "exclusive" or "modified".

There may be one central GOTL. Alternatively, the GOTL may be distributed, so that every device that can request a copy of memory data may maintain an identical copy of the GOTL. Examples of devices that can request a copy of memory data include processors, bus bridges, and snoop filters. For either embodiment, if a line is requested by a device, the tag for the line is compared against the GOTL (central list, or list maintained by the requesting device).

Figure 1:
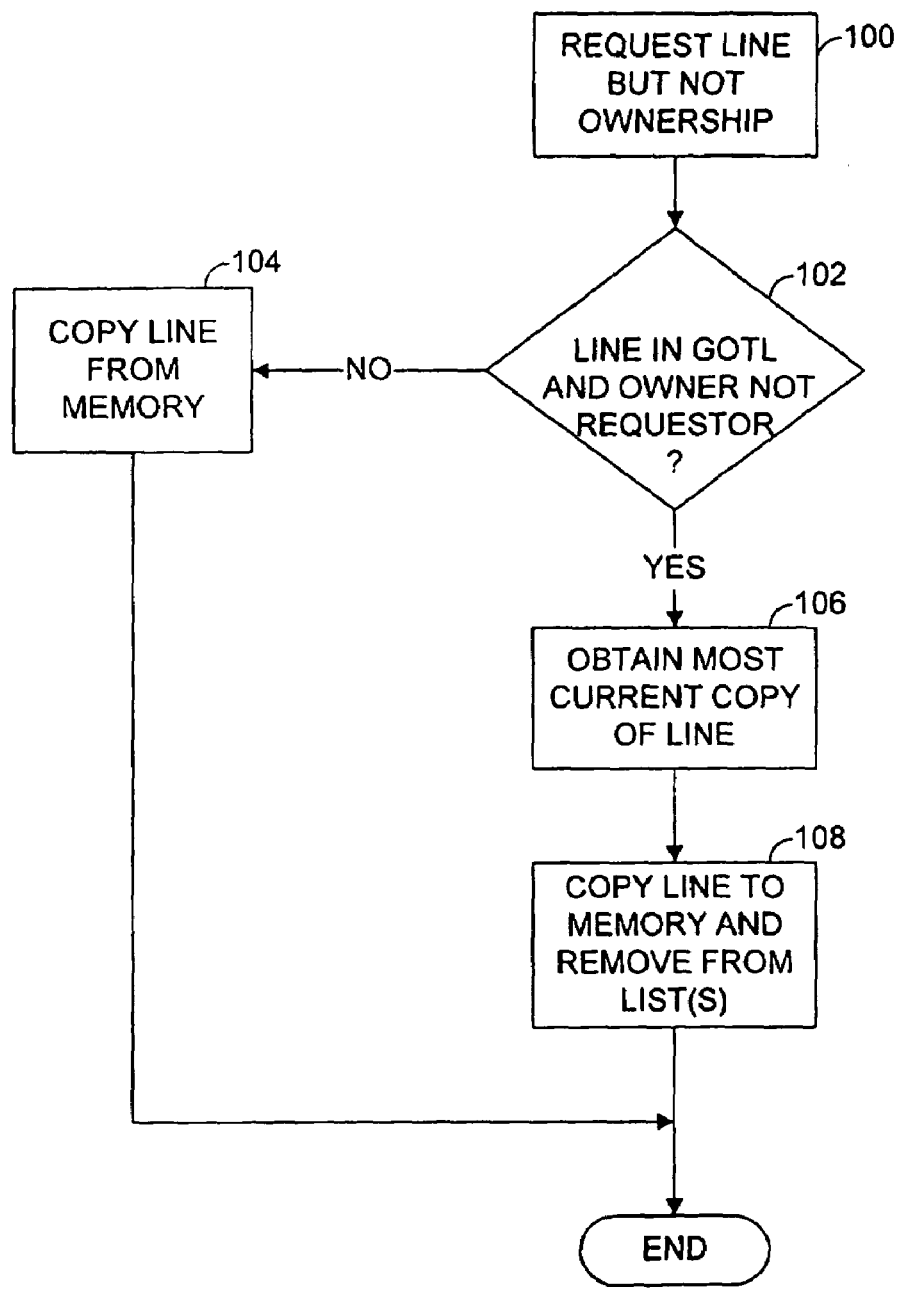
FIG. 1 is a flow chart of a request for a line, without requesting ownership, in a system with a GOTL, in accordance with the invention.
Figure 2:
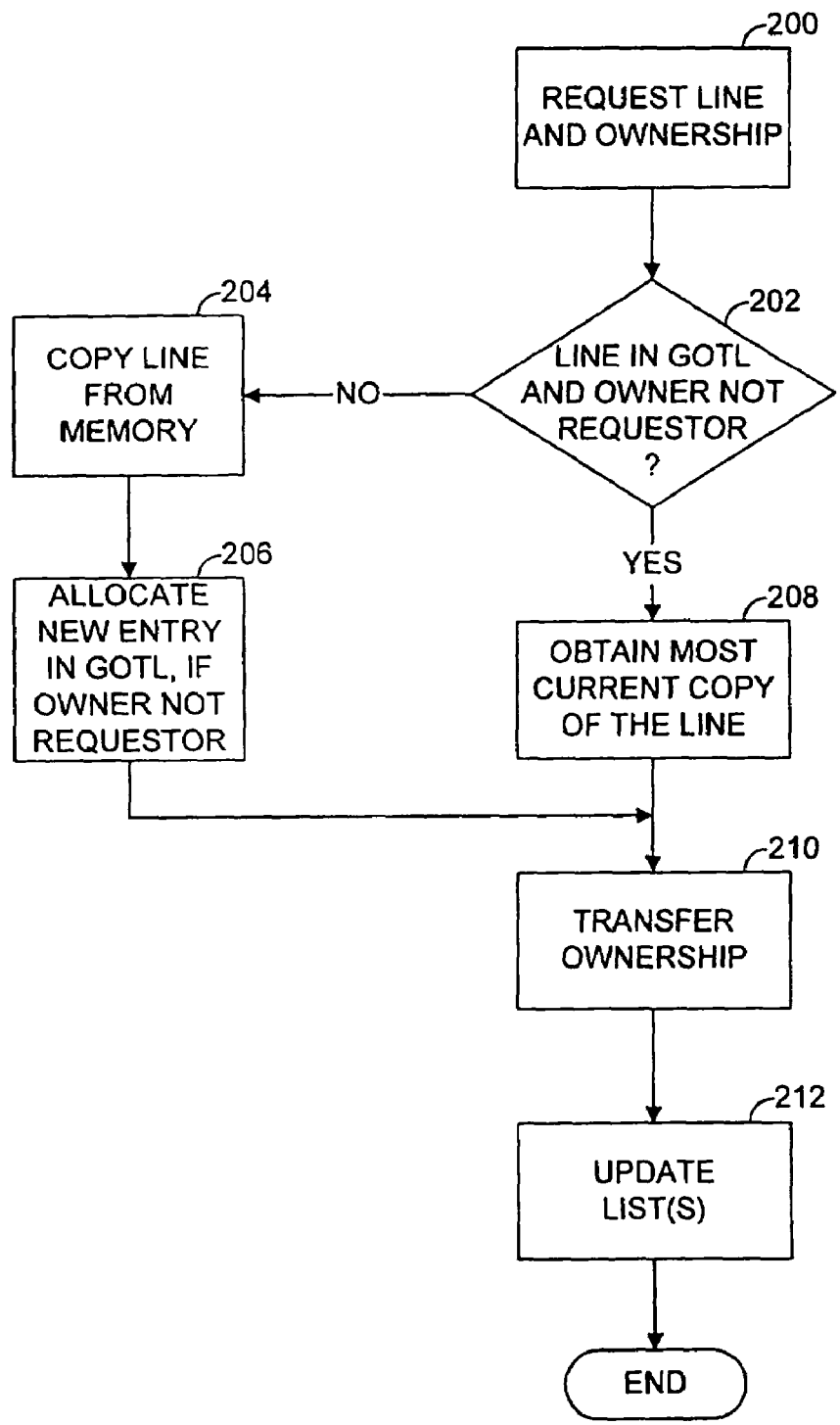
FIG. 2 is a flow chart of an request for ownership, in a system with a GOTL, in accordance with the invention.

FIGS. 1 and 2 illustrate the four possible conditions. In FIG. 1, a device requests a line, but not ownership (step 100). If the tag is not in the GOTL (test 102), then no cache owns the line, and the line is copied from memory (step 104). If the line is in the GOTL (and if the requestor is not the owner), then the most current copy of the line is obtained (step 106). Since the owner may modify the line without issuing a coherency transaction, if the line remains owned it would be possible to violate coherency. Therefore, the entry in the GOTL is removed and the line is copied to memory (step 108). In FIG. 2, a device requests a line and ownership of the line (step 200). If the tag is not in the GOTL (test 202), then the line is copied from memory (step 204). In addition, since the requesting device is now the owner of the line, a new entry must be allocated in the GOTL (step 206) to designate the new ownership. Note that in order to allocate a new entry, an existing entry may have to be evicted. This is discussed in more detail later. If the tag is in the GOTL (and if the requester is not the owner), then the most recent copy of the line is obtained (step 208). For either path, ownership is transferred (step 210), and the GOTL is updated to designate the new ownership (step 212).

Figure 3A:
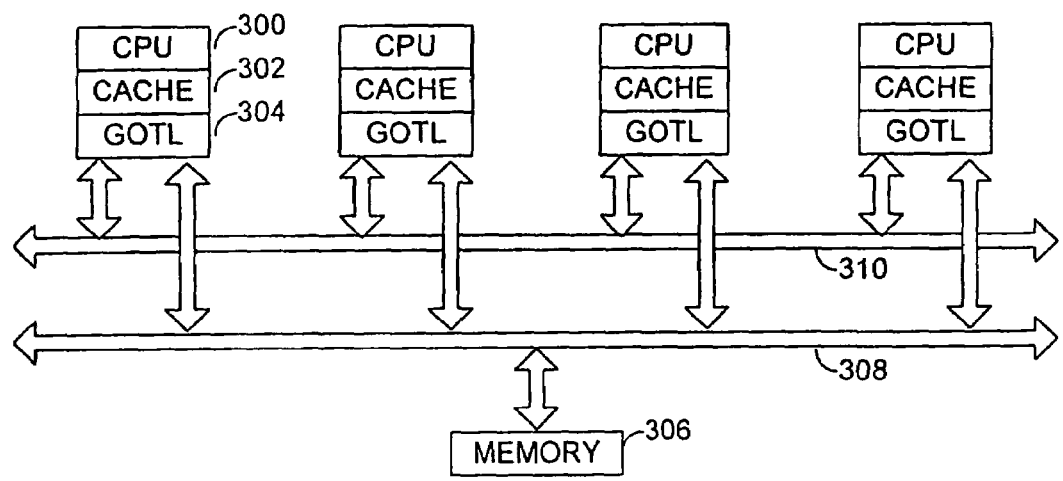
FIGS. 3A and 3B are block diagrams of an example computer system, with a separate coherency bus, and with a GOTL.
Figure 3B:
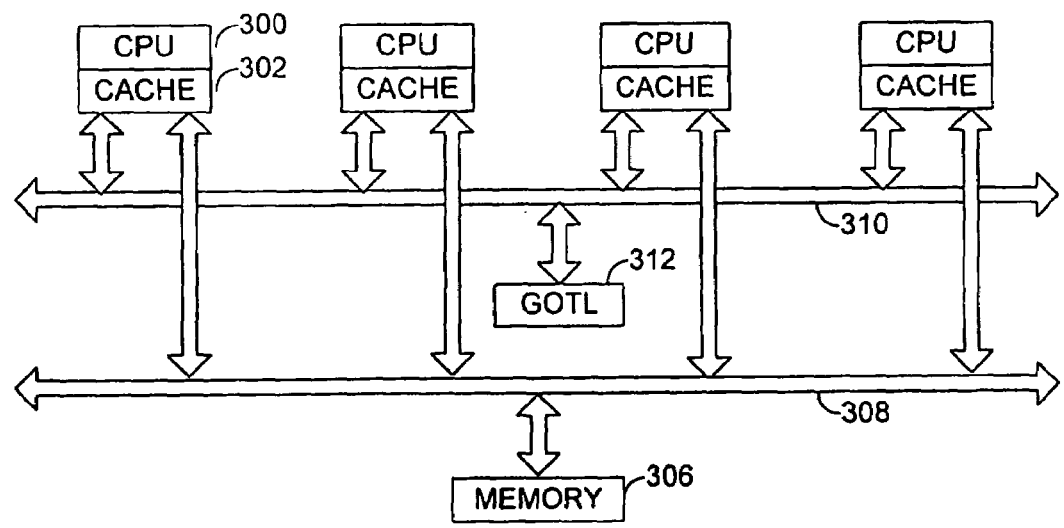

FIG. 3A illustrates an example cache-coherent, shared-memory, multiprocessor computer system, with a distributed GOTL, and multiple buses. The computer system in FIG. 3A has multiple nodes, each comprising a CPU 300, cache memory 302, and a GOTL 304. All the nodes share a main memory 306, and share a memory bus 308 for memory transactions. In FIG. 3A, coherency bus traffic is moved to a separate coherency bus 310. The coherency bus 310 may alternatively be a network, or any interconnection system that can provide ordering of transactions, so that each GOTL sees transactions in the same order. Again, multiple CPU's may share one cache memory, and multiple CPU's may share one GOTL. FIG. 3B illustrates a two-bus system as in FIG. 3A, but with a central GOTL 312 on the coherency bus 308.

Figure 4A:
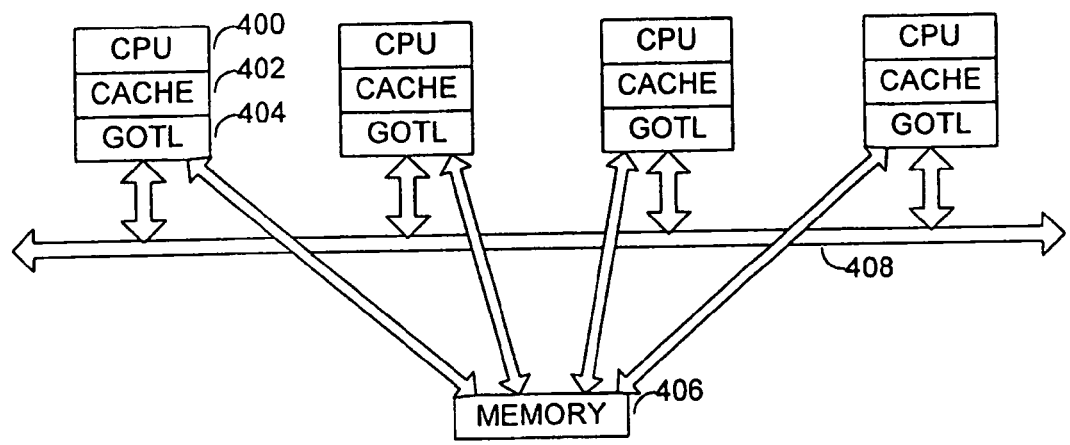
FIGS. 4A and 4B are block diagrams of a second example computer system, with point-to-point connections to main memory, and with a GOTL.
Figure 4B:
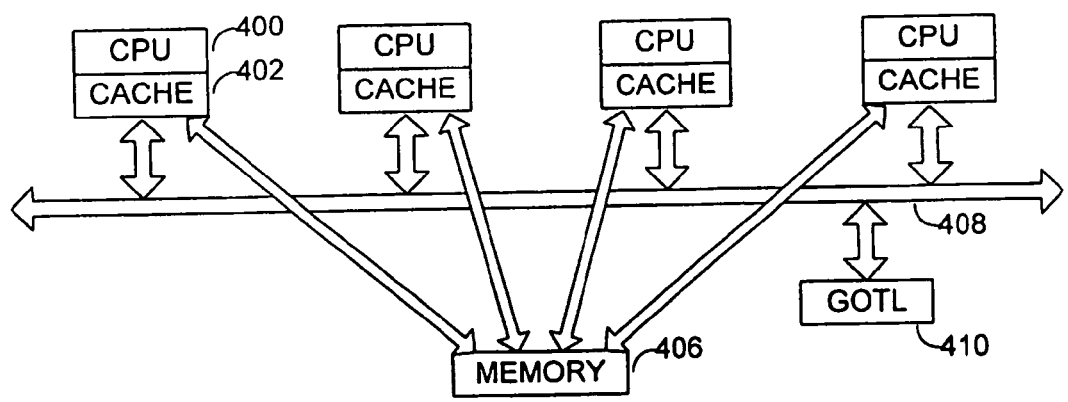

FIG. 4A illustrates an alternative example system, with a distributed GOTL. The computer system in FIG. 4A has multiple nodes, each comprising a CPU 400, cache memory 402, and a GOTL 404. All the nodes share a main memory 406. Coherency bus traffic uses a dedicated coherency bus 408. Communication between nodes and main memory is point-to-point. Again, multiple CPU's may share one cache memory, and multiple CPU's may share one GOTL. FIG. 4B illustrates point-to-point memory communication as in FIG. 4A, but with a central GOTL 410 on the coherency bus 408. With point-to-point communication, all nodes can access the main memory 406 simultaneously. A system as in FIGS. 4A and 4B allows a large percent of memory transactions to be sent directly to memory without the need to globally snoop, and without the need to wait for snoop responses. In addition, global arbitration and snoop queuing delays are reduced. In general, point-to-point technologies may be made faster than bus technologies. Accordingly, a system as in FIGS. 4A and 4B may have substantially improved performance compared to the system in FIGS. 3A, 3B.

For a central GOTL configuration, some bus traffic is needed to determine the state of the line, but this can be done without cycling memory, and with less latency than a memory read. In a GOTL based system, a simple read of a shared line does not require the list to be updated, as opposed to a directory-based system, or to a global coherency filter, which require the memory controller or filter to update tags to indicate yet another copy of the line in use. The only time a GOTL needs to be updated is when a line transitions from owned to shared, from shared to owned, or when ownership changes. These are the only transactions that need occur on the coherency bus. Accordingly, a central GOTL improves performance relative to a directory-based system, and relative to a global coherency filter system.

For a distributed GOTL configuration, the only broadcast traffic is for requests for ownership. In a distributed GOTL embodiment, if an owned line is retrieved, the system can direct the transfer of the data and the ownership without requiring further bus traffic to determine the state of the line. Accordingly, a distributed GOTL system improves performance relative to a central GOTL system, at the expense of multiple copies of the GOTL.

When ownership of a line is changed, the former owner must invalidate its copy of the line. Whenever a new line entry is added to the GOTL, all caches must invalidate their local copies of the line. In the case of a distributed GOTL, each cache associated with a GOTL will invalidate its copy of a line when it observes the broadcast of a line insertion request. Thus, the receipt of an allocate transaction triggers an invalidate transaction on local buses.

As discussed above, a GOTL improves performance relative to a directory, or to a global coherency filter. An additional important advantage of a GOTL, compared to alternatives, is size. A GOTL can be much smaller than a directory or a global coherency filter. A directory must be able to reference every line in memory. A global coherency filter must reference every line in all caches. In contrast, a GOTL only has to reference every owned line, and many cached lines are not owned. In addition, if memory is added, a directory must increase in size. If caches are added, a global coherency filter must increase in size. In contrast, a GOTL can remain one size, even if memory and caches are added, because the size of the GOTL can limit the number of owned lines.

A limited-size GOTL may fill. If the list is full, then an old owned line must be evicted to make room for a new owned line. This is a familiar problem for caches, and many known replacement algorithms may be used to determine which line to replace. For example, the oldest owned line may be evicted (first-in-first-out), or eviction may be pseudo-random, etc. A line associated with an evicted tag must be written back to memory if actually modified. If the GOTL is distributed, and if all GOTL's use the same eviction algorithm, then since all GOTL's see all insertion requests, they will all evict the same line without need of an additional broadcast.

In addition to a replacement algorithm for a full list, strategies may be employed to help prevent the list from filling. For example, owned lines could be written back to memory when specific events occur. For example, the age of each entry could be monitored, and lines evicted if they remain in the list for longer than a specified time. Alternatively, during idle times, even if the list is not full, a replacement algorithm could choose owned lines to be written back to memory, and the corresponding tags would be removed from the list.

Like other cache coherence protocols, a GOTL based system must arbitrate simultaneous requests for the same line. A specific order of ownership transition must be followed by all devices. On a snoop based system, arbitration and ordering is enforced by the bus on which two requests collide. In a directory-based system, arbitration and ordering is enforced by the manager of the tags. For arbitration and ordering, a GOTL based system can mimic either a snoop based system, or a directory-based system, or a hybrid of both. A central GOTL based system may use a central resource, such as a coherency bus architecture or memory controller, to arbitrate and control order. A distributed GOTL based system may use industry standard arbitration techniques.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method for maintaining cache coherency in a computer system, comprising:
    entering into a list, an address reference for all lines that are owned;
    not entering into the list address references for lines that are shared or uncached; and
    updating the list only when ownership of a line changes.

2. The method of claim 1, further comprising:
    removing an address reference to a line, from the list, when the line is written to memory.

3. The method of claim 1, further comprising:
    allocating a new entry in the list when a line is not referenced in the list and ownership of the line is requested by a device.

4. The method of claim 3, the step of allocating a new entry in the list further comprising:
    evicting a line from the list; and
    copying the evicted line to memory.

* * * * *